United States Patent
Figa et al.

[19]

[11] Patent Number: 6,106,268
[45] Date of Patent: Aug. 22, 2000

[54] INTERNAL DECKLE FOR FILM EXTRUSION DIES

[76] Inventors: John K. Figa, 50 Sergeantsville Rd., Flemington, N.J. 08822; William J. Sechler, 3810 Camden St., Palmer Twp, Pa. 18045

[21] Appl. No.: 09/029,353

[22] Filed: Feb. 24, 1998

Related U.S. Application Data

[60] Provisional application No. 60/003,419, Sep. 8, 1995.

[51] Int. Cl.⁷ .................................................. B29C 47/16
[52] U.S. Cl. ............................................ 425/381; 425/466
[58] Field of Search ............................. 425/382.4, 376.1, 425/192 R, 465, 466, 381

[56] References Cited

U.S. PATENT DOCUMENTS

| | | | |
|---|---|---|---|
| 4,659,302 | 4/1987 | Maejima | 425/466 |
| 5,505,609 | 4/1996 | Cloeren et al. | 425/466 |
| 5,511,962 | 4/1996 | Lippert | 425/466 |

FOREIGN PATENT DOCUMENTS 4-307220  10/1992  Japan.

*Primary Examiner*—Harold Pyon
*Assistant Examiner*—Joseph Leyson
*Attorney, Agent, or Firm*—Raymond D. Thompson

[57] ABSTRACT

A film extruder employing an internal deckle system including a pair of rectangular metal bars disposed in the pre-land area of the die one above the other with the opposing edges of each bar having a tapered surface. The tapered surfaces cause the bars to increase or decrease the total with of the flag when one of the bars is moved and to provide sufficient sealing pressure to effectively seal off the pre-land area. Preferable, the tapered wedge flags are disposed below the usual plug at each end of the extruder and apply sealing pressure against a deckle rod adjustably placed below the tapered wedge bars.

9 Claims, 2 Drawing Sheets

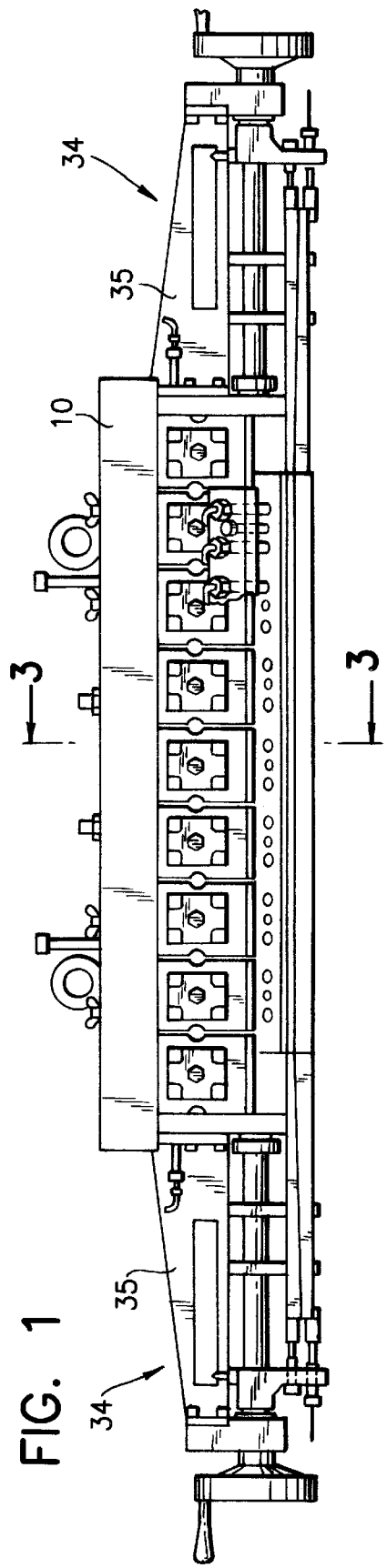
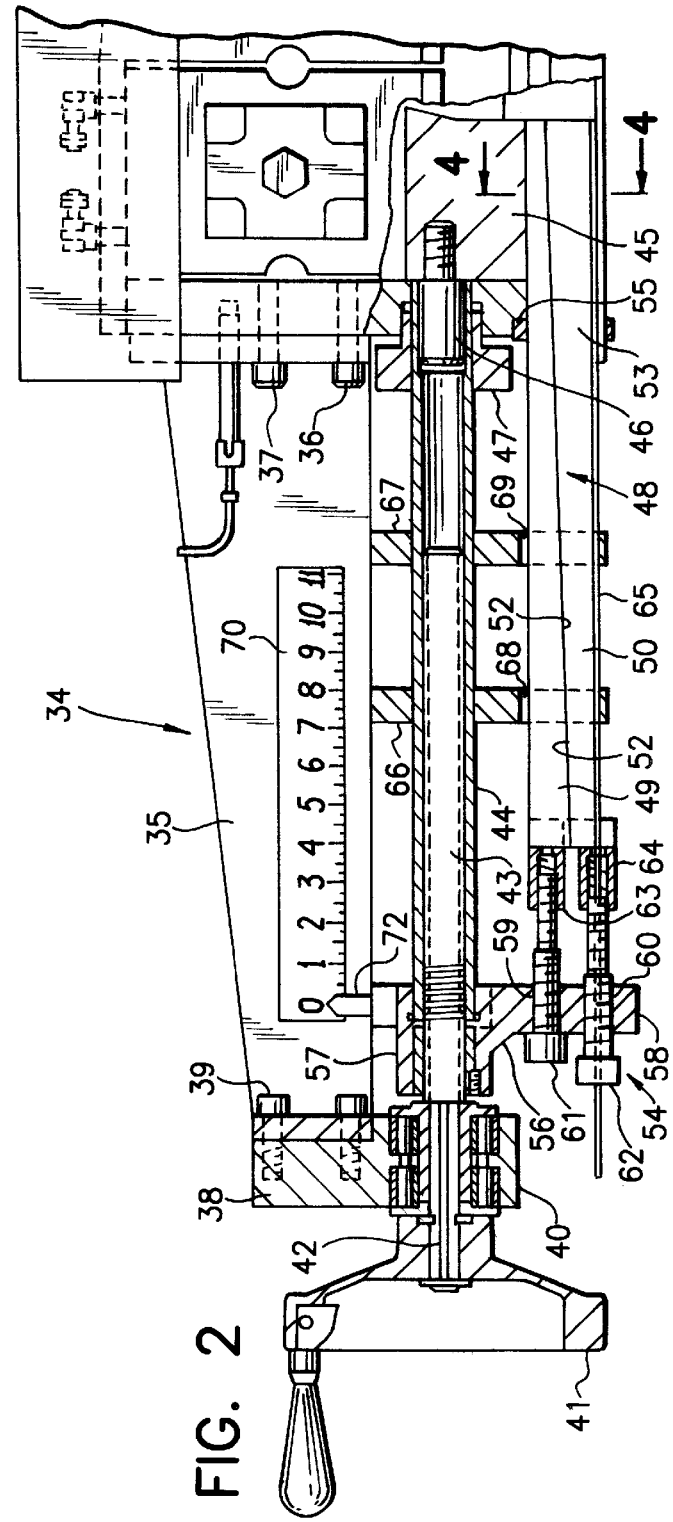

INTERNAL DECKLE FOR FILM EXTRUSION DIES

This application claims the benefit of U.S. Provisional application No. 60/003,419 filed on Sep. 8, 1995.

BACKGROUND OF THE INVENTION

(1) Field of the Invention

This invention relates to extrusion dies for extruding thin plastic film and more particularly to an improved internal die deckle for more effectively sealing the pre-land area of the die and to reduce or eliminate edge build up as the film is being extruded. The internal die deckle differs from known die deckles in that it employs a wedge flag composed of two tapered bars which are adjustable one with respect to the other for sealing the ends of the elongated die in the film extruder.

(2) Description of the Prior Art

U.S. Pat. No. 4,454,084 issued to D. J. Smith discloses a film extruder of the general type to which the invention pertains including a die body having an internal manifold for feeding a molten polymer to an extrusion orifice defined between a pair of die jaws. Deckles at each end of the die body are adjustable within a narrow passageway or "pre-land" leading to the orifice by means of pinions and gear teeth which control longitudinal movement of each deckle to adjust the length of the die opening.

U.S. Pat. No. 3,832,120 issued to R. L. Shaffer on Aug. 27, 1974 discloses a film extruder employing both primary and secondary internal deckles. The deckles are adjustable one with respect to the other in the longitudinal direction along the pre-land area of the die. However, the deckles are not adjustable in the transverse direction for applying sealing pressure to a deckle rod.

European Patent Publication No. 0 579,142 A1 dated Jan. 19, 1994 discloses a film extruder employing an internal deckle supported by a hanging clamp assembly including a lead screw and hand wheel for longitudinally moving the deckle and a deckle plug within the area of the pre-land and manifold. However, this deckle system includes only a single deckle bar as opposed to a pair of separate bars.

SUMMARY OF THE INVENTION

The present invention is directed to a film extruder employing an internal deckle system including a pair of rectangular metal bars disposed in the pre-land area of the die one above the other with the opposing edges of each bar having a tapered surface. The tapered surfaces cause the bars to increase or decrease the total with of the flag when one of the bars is moved and to provide sufficient sealing pressure to effectively seal off the pre-land area. Preferable, the tapered wedge flags are disposed below the usual plug at each end of the extruder and applies sealing pressure against a deckle rod adjustably placed below the tapered wedge bars.

BRIEF DESCRIPTION OF THE DRAWING

FIG. 1 is a side elevational view of a film extruder embodying the invention;

FIG. 2 is an enlarged elevational view of the right hand portion of the film extruder shown in FIG. 1, part being cut away to show details of construction;

DESCRIPTION OF THE PREFERRED EMBODIMENTS

Figure 3:
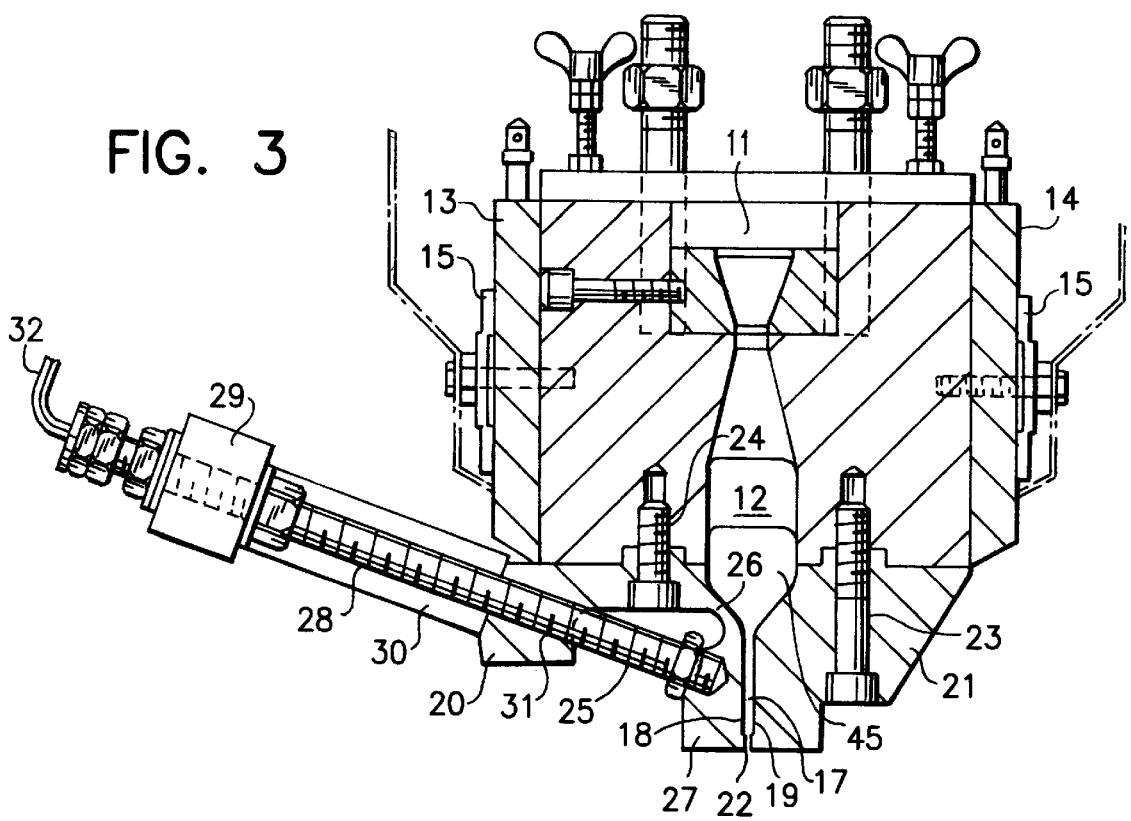
FIG. 3 is an enlarged cross sectional view of the film extruder taken along the line 3—3 in FIG. 1.

Referring now to the drawing and more particularly to FIGS. 1–3 thereof, there is shown a film extruder including a body 10 of generally elongated, rectangular shape having a length which is greater than the width of the plastic film to be extruded. The film is extruded from a molten polymer which is fed through an opening 11 at the top of the body and then to an elongated manifold 12. Affixed to the external sides of the body 10 are die heaters 13, 14 which are secured by heater clamps 15. Thermo couples (not shown) are secured to the body 10 to measure the temperature of the die.

Figure 4:
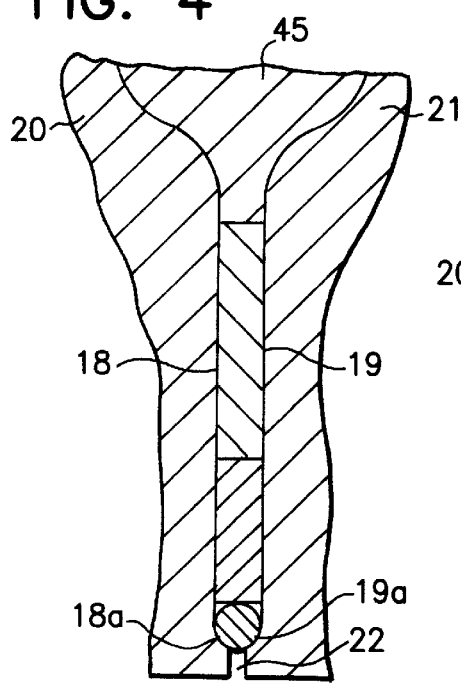
FIG. 4 is a greatly enlarged cross sectional view of a portion of the film extruder taken along the line 4—4 in FIG. 2.

The manifold 11 extends along the body 10 and leads to a narrow passageway 17 defined by opposite vertical and parallel walls 18, 19 on two die jaws 20, 21, the passageway defined by the walls being commonly referred to as the "pre-land". The lowermost portion of the walls 18, 19 are notched as at 18a, 19a (see FIG. 4) to form a lip-land and a narrow, external orifice 22 which extends the full length of the body 10.

Die jaw 21 is fixed in position on the body and is held by screws 23. Die jaw 20, on the other hand, is adjustable and is also secured by means of screws 24.

Adjustable die jaw 20 is formed with an open area 25 and has a narrow wall section 26 which is bendable allowing the lower jaw section 27 to be moved or adjusted with respect to the other fixed jaw 21.

Adjustment of the lower jaw section 27 and consequently the width of the external orifice 22 is achieved by a series of thermal die adjusting bolts 28. The adjusting bolts 28 are mounted at spaced intervals along the body 10 and are supported at each outer end by a holder bar 29. The bar 29 is mounted to the die jaw 20 by a series of posts 30 extending outwardly from the die jaw.

Each of the thermal adjusting bolts 28 are mounted through an opening 31 in the outer portion of the adjustable die jaw 20. The bolts extend through the open area 25 and are secured to the lower jaw section 27.

Although not shown in the drawing, the adjustable bolts are hollow and contain a cartridge heater and a thermocouple for measuring the temperature within the bolt. Electrical connections 32 for the heater and thermocouple are provided through the outer ends of each bolt. The lower jaw section 27 adjacent to extrusion orifice 22 is movable with the axial expansion and contraction of the bolt between the holder bar 29 and the jaw section 27 when the bolt is heated and cooled.

The width of the extrusion orifice is continuously monitored by a sensor and computer system (not shown) which controls the heating and cooling of the adjustable bolts 28 automatically via the electrical connections 32 provided on each bolt. Reference is made to U.S. Pat. No. 4,454,084 supra for a more detailed explanation of the thermal adjusting bolt design and operation.

An adjustable deckle assembly 34 is provided at each end of the die body 10 for adjusting the length of the extrusion orifice 22 and accordingly the resulting width of the extruded plastic film.

As shown in greater detail in FIG. 2, each deckle assembly includes an elongated frame 35 having at one end a support plate 36 which is secured to an end of the die body 10 by means of screws 37. A journal plate 38 is mounted to the opposite end of the frame 35 by means of screws 39. The journal plate supports a journal bushing 40 to which is mounted a hand wheel 41. The hand wheel 41 is secured by means of an elongated bolt 42 to the outer end of a lead screw 43. The lead screw extends through and engages an internally threaded tube 44 positioned just below the frame 35. The tube 44 is closed at its inner end by a threaded stud fitting 46 which is secured to a plug 45.

The plug 45 is a large block of sufficient size and shape to fit inside the manifold 11 and to reduce the manifold length and prevent the polymer from freely flowing into the "unused" or end of the die. Typically, the plug is positioned a short distance in from the edge of the melt curtain, say about two or three inches, for example.

Rotation of the hand wheel 41 in either the clockwise or counter-clockwise direction causes the tube 44 to move longitudinally back and forth along the lead screw 43 and positions the plug 45 at a desired location within the end of the manifold 11. An annular bushing 47 surrounds the inner end of the tube 44 and helps to guide the tube smoothly as it passes through the end of the die.

An internal die deckle shown generally at 48 is provided for effectively sealing each end of the die and to reduce or eliminate edge build up as the film is being extruded. The internal deckle is provided in the form of a tapered wedge flag composed of two elongated, rectangular shaped, metal bars 49, 50, preferably made of brass, for example. The two wedge flags or bars are disposed one on top of the other with the opposing edges of each bar having oppositely tapered surfaces 52, as best shown in the view of FIG. 2. The upper and lower flags or bars 49, 50 are mounted below the plug 45 and are positioned inside the die within the passageway 17 or per-land. Although the plug and wedge flags are shown in substantially aligned position for purposes of illustration, the upper and lower flags are normally located a short distance behind the plug 45 during operation of the die or towards the outer edge of the melt curtain.

Both wedge flags or bars 49, 50 extend outwardly through the opening 53 within the end of the die and are connected to the tube 44 and lead screw 43 by a hanging clamp assembly generally indicated at 54. A seal fitting 55 is positioned around the flags and seals of the opening 53.

The hanging clamp assembly 54 includes an outer support 56 having a tubular portion 57 which is fixed to the tube 44. The support 56 further includes a depending portion 58 having a pair of openings 59, 60 positioned one over the other and within which are threadably mounted a pair of adjustable screws 61, 62.

The upper screw 61 is rotatably affixed to the outer end of the upper wedge flag 49 by means of an internally threaded end fitting 63. In a similar fashion, the lower adjusting screw 62 is rotatably affixed to the outer end of the lower wedge flag 50 by means of the threaded end fitting 64. It will be seen then by this arrangement that each of the wedge flags can be moved independently of the other in the longitudinal direction toward and away from the plug 45 within the pre-land 17.

A deckle rod 65 is positioned between the lower wedge flag 50 and the lower notched edges 18a, 19a of die jaw walls 18, 19, (see FIG. 4) an area commonly referred to as the "lip-land". The deckle rod also extends outwardly from the end of the die beneath the lower wedge flag 50 and passes axially through the end fitting 64 and adjusting screw 62. The deckle rod is normally a small diameter metal rod about 0.09 inch, for example, and serves as the final die opening device. The deckle rod is most effectively positioned a short distance behind the flag or towards the outer edge of the melt curtain.

Finally, a pair of clamp supports 66, 67 are mounted around the tube 44 and have openings or slots 68, 69, respectively, for receiving the two wedge flags 49, 50. A scale 70 which may be marked off in inches, for example, is mounted to the frame 35 for measuring the distance over which the plug and wedge flags travel. A pointer 72 may be attached to the support 56 to aid in locating the position of both the plug and wedge flags inside the pre-land 17.

Operation of the internal die deckle may be explained as follows;

1. To adjust the plug/flag relationship: The desired offset between the plug 45 and the wedge 48 flag is set by turning the upper adjusting screw 61 attached to the upper wedge flag 49. Turning the screw clockwise will increase the offset (i.e., this will retract the wedge from the die) and turning it clockwise will increase the offset (i.e., this will insert the wedge into the die). When decreasing the offset, it is important not to engage the wedge. If this happens, the lower wedge flag 50 must be advanced by turning the lower adjusting screw 62 clockwise. This will cause the lower flag to be inserted into the die. The actual offset is determined by taking the initial offset and adding the distance between the hanging support and the back of the cap on the adjusting screw.

2. To engage the wedge: This is done by rotating the bottom screw 62 counter-clockwise until it is snug. If the deckle rod does not seal, continue to turn the adjusting screw counter-clockwise. In the engaged position, the upper and lower wedge flags should be flush.

3. To move the deckle rod or change the deckle area: Disengage the wedge 48 by turning the lower adjusting screw 62 clockwise. This will insert the rod into the die and remove the pressure from the deckle rod. After this is done the rod can be adjusted or the entire plug, flag and rod arrangement can be moved via the handwheel 41. When the desired operation is complete, the wedge may be engaged by following step 2 above.

The purpose of the wedge flags is to provide a uniform sealing to the deckle rod. This force will push the rod into transition between the pre-land and the lip-land. When this happens, the portions of the die that the rod covers will be deckled.

It is of course possible to employ an internal deckle according to the invention but without the usual plug 45 within the manifold 11. Such an arrangement is shown, for example, in the view of FIG. 5. It is also possible to employ both the upper and lower wedge flags 49, 50 without the usual deckle rod 65 providing a good seal is achieved between the edges of the lower flag and the lip-land.

Figure 5:
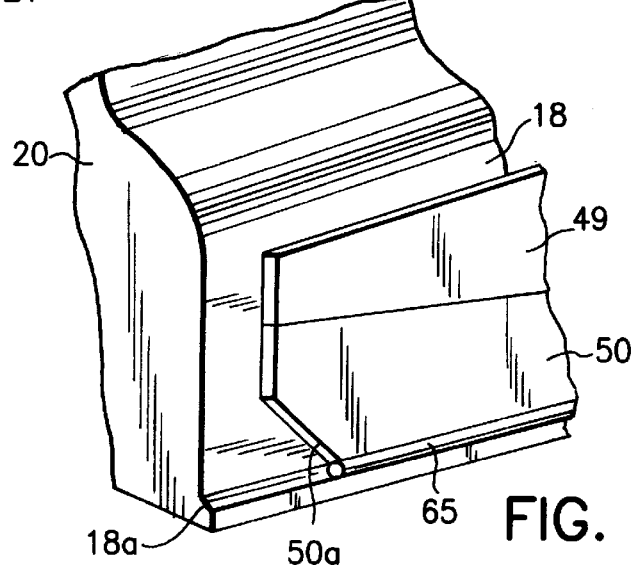
FIG. 5 is an enlarged pictorial view of another embodiment employing the tapered wedge flags but without the usual plug and deckle rod.

It should also be mentioned that the tapered wedge and particularly the lower wedge flag 50 may be configured at its forward most end to provide a smooth edge or relief as at 50a in FIG. 5, depending upon to characteristics of the particular polymer being extruded. Similarly, the forward edge of the plug 45 is normally curved as at 45a (FIG. 2) to more evenly direct the polymer toward the orifice 22.

What is claimed is:

1. A film extruder comprising, in combination: an elongated die body having a manifold therein for receiving a molten polymer, said die body having opposing die surfaces forming a narrow passageway leading from said manifold to an extrusion orifice extending longitudinally across said die body; and an internal die deckle for adjusting the length of said orifice, said die deckle comprising at least two elongated deckle bars positioned one on top of the other within said passageway, said deckle bars having oppositely tapered edge surfaces contacting one another such that movement of one bar longitudinally within said passageway wedges the other bar in a transverse direction toward said orifice, sealing said orifice at an end of said passageway.

2. A film extruder according to claim 1, further including means for independently moving each of said deckle bars in a longitudinal direction.

3. A film extruder according to claim 2, further including a plug within said manifold above said passageway.

4. A film extruder according to claim 3, further including means for independently moving said plug in a longitudinal direction.

5. A film extruder according to claim 4, further including a deckle rod positioned between one of said deckle bars and said orifice.

6. A film extruder according to claim 5, wherein said deckle bars extend outwardly from an end of said die body and wherein said deckle bars are supported at their outer ends by a hanging clamp assembly.

7. A film extruder according to claim 6, wherein said hanging clamp assembly includes a frame attached at one end to said die body and having a journal plate affixed to the other end thereof, said journal plate carrying a journal bushing for rotatably mounting a hand wheel to said assembly.

8. A film extruder according to claim 7, wherein said means for moving said plug includes a lead screw connected at one end to said hand wheel, said lead screw internally engaging a tube attached at one end to said plug, the arrangement being such that said tube and said plug move longitudinally in response to rotation of said hand wheel.

9. A film extruder comprising, in combination:

an elongated die body having a manifold therein for receiving a molten polymer, said die body having opposing die surfaces forming a narrow passageway leading from said manifold to an extrusion orifice extending longitudinally across said die body;

an internal die deckle for adjusting the length of said orifice, said die deckle comprising at least two elongated deckle bars positioned one on top of the other within said passageway and extending outwardly from an end of said die body, said deckle bars having oppositely tapered edge surfaces contacting one another such that movement of one bar longitudinally within said passageway wedges the other bar in a transverse direction toward said orifice, sealing said orifice at said end of passageway;

means for independently moving each of said deckle bars in a longitudinal direction;

a plug within said manifold above said passageway;

a deckle rod positioned between one of said deckle bars and said orifice;

a hanging clamp assembly for supporting said deckle bars at the outwardly extending ends thereof, said clamp assembly including a frame having opposite ends, said frame being attached at one of said ends to said die body;

a hand wheel rotatably mounted within the other of said opposite ends of said frame;

a tube attached at one end to said plug; and a lead screw connected at one end to said hand wheel and internally engaging said tube, the arrangement being such that said tube and said plug move longitudinally in response to rotation of said hand wheel.

* * * * *